United States Patent Office 3,416,559
Patented Dec. 17, 1968

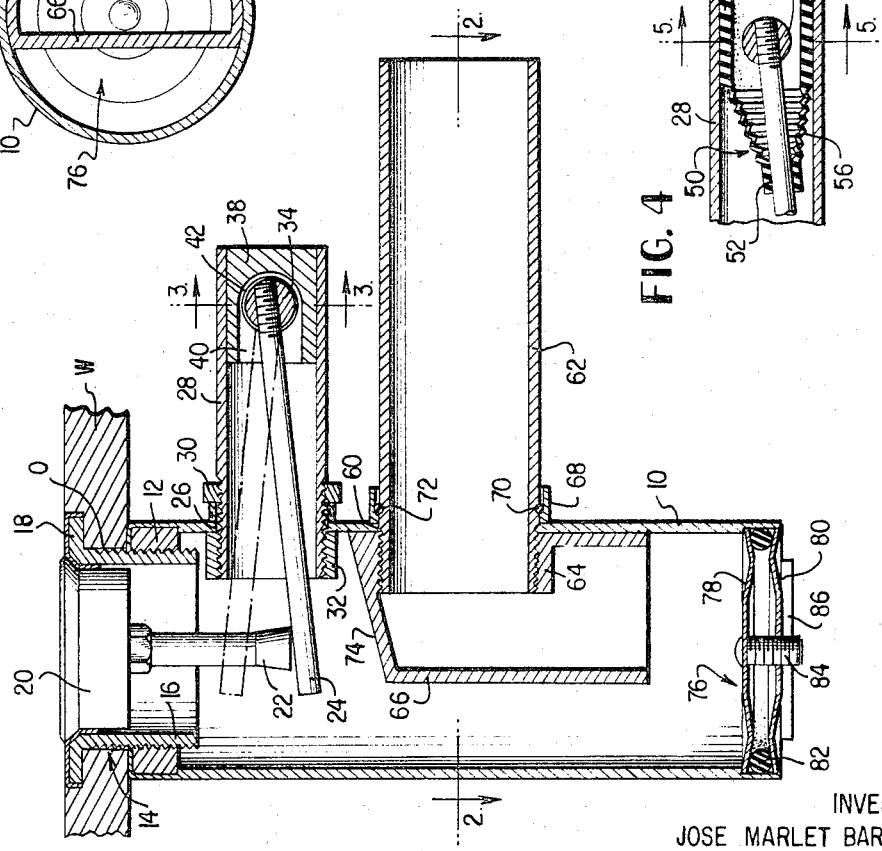

3,416,559
COMBINATION DRAIN AND TRAP UNIT
Jose Marlet Barrera, Po. Valldoreix 6, San Cugat
del Valles, Barcelona, Spain
Filed July 27, 1966, Ser. No. 568,276
Claims priority, application Spain, July 30, 1965
316,278
5 Claims. (Cl. 137—247.13)

This invention relates to drain valve mechanisms and more particularly to a combination drain valve and sanitary trap in a unitary assembly.

Drain valves and sanitary traps usually are provided as separate units that must be joined by the plumber installing the apparatus and therefore involves considerable time and labor costs. It has been suggested that these parts be incorporated in a single unit but such arrangements have required complicated castings that have increased costs to the extent that they are not commercially feasible.

Having in mind the defects of the prior art structures, it is the principal object of the present invention to provide a combination drain and trap assembly of extremely simple design, that may be fabricated at low cost and which has great efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a cross-sectional view taken vertically through a combination drain and trap unit according to the present invention;

FIGS. 2 and 3 are cross-sectional views taken on lines 2—2 and 3—3 respectively of FIG. 1;

FIG. 4 is a fragmentary cross-sectional view showing a modified form of seal for the drain valve actuating lever, and FIG. 5 is a cross-sectional view taken on line 5—5 of FIG. 4.

Referring now specifically to the drawing, particularly to FIG. 1, a unit according to the present invention comprises a main body 10 constituted by a simple tubular member, conveniently a stainless steel tube. The tube 10 is provided at its upper end with an internally threaded, inwardly disposed collar 12 adapted to be disposed against the underside of the bottom wall W of a tub, sink or the like and in line with the drain opening O in said wall. A valve seat member 14 including an externally threaded tubular portion 16 and a radial upper flange 18 is positioned with the tubular portion 16 inserted through the opening O and threaded into the collar 12 to securely position these parts. Obviously, suitably sealing materials may be employed to prevent leakage.

A standard drain valve 20 is movably positioned in the valve seat member 14 and has a depending shank 22 engaged by a lever 24 for lifting the valve 20 in the usual manner. To accommodate the lever 24, the tube 10 is provided with an opening 26 in its cylindrical wall and in which is radially disposed a tube of cylinder 28, the inner end of which is externally threaded. A lock nut 30 and sealing washer are threaded on the cylinder 28 externally of the tube 10 and a sealing nut 32 is threaded on the cylinder 28 internally of the tube 10 to securely support the cylinder 28 rigidly on the tube 10. The valve operating lever 24 extends through the cylinder 28 and the outer end of said lever is fixed to a shaft 34 disposed diametrically of and extending through at least one side of the cylinder 28 for connection with the usual operating lever 36, FIG. 3.

The outer end of the cylinder 28 is sealed by a plug 38, FIG. 1, formed of rubber or the like and having a central inwardly opening U-shaped socket 40 for accommodating the lever 24, and a transverse bore 42 opening through said socket for the cross shaft 34. As shown in FIG. 3, the shaft 34 extends through an opening 39 in one side only of the cylinder 28. A bearing sleeve 44 is mounted in the bore 42 on one side of the socket 40 and on the other side, toward the opening 39, the plug 38 has a protruding neck portion 46 that is compressed by a spring clamp 48 to snugly engage the shaft 34 and the inner cylinder wall surrounding the opening.

Alternatively, in lieu of the plug 38, the seal, as shown in FIGS. 4 and 5, may comprise a sleeve 50 of rubber or the like and including a first ring portion 52 snugly surrounding the lever 24, a second ring portion 54 snugly engaging the inner side of the cylinder 28 and surrounding the shaft 34', and an extensible or flexible or bellows-like portion 56 connecting the ring portions. The shaft 34' may extend through both sides of the cylinder 28 and the lever 24 secured to the shaft by an axially disposed set screw 58 instead of the lever threading into the shaft.

To accommodate the sanitary trap, the tube 10 is provided with a second opening 60 in its cylindrical wall to receive an outlet tube or pipe 62, the inner end of which is externally threaded for insertion through the opening 60 and threading into the outlet portion 64 of a trap member 66, as shown in FIGS. 1 and 2. A sealing ring 68 surrounds the pipe 62 and is of a configuration to conform to the outer wall of the tube 10 around the opening 60. This ring 68 is retained by a snap ring 70 seated in a groove 72 around the pipe 62. The arrangement permits rotation of the pipe 62 relative to the sealing ring 68 for the threading of the inner end of the pipe into the trap portion 64. This type of seal may be used on the cylinder 28 in lieu of the lock nut and seal 30.

The trap member 66 is cast or molded of any suitable material and is semicircular in cross-section as shown in FIG. 2. The bottom of the trap member is open and the upper end is closed by an inclined top wall 74 immediately above the outlet portion 64. The inclined top wall inhibits the collection of foreign matter thereon. The bottom of the tube 10, spaced below the bottom of the trap member 66, is sealed by a removable closure 76 comprising a pair of dished diaphragms 78 and 80 having angularly disposed rims. The diaphragms are arranged in opposed relation and a sealing ring 82 is positioned between said rims.

A bolt 84 is threaded through an axial opening in the lower diaphragm 80 and has its inner end rotatably secured to the upper diaphragm 78. The bolt is provided with wings or a handle 86 which serves for turning the bolt and drawing the diaphragms 78 and 80 together to compress said diaphragms toward each other so that their outwardly angled rims force the ring 82 outwardly into sealing engagement with the inner wall of the tube 10. Opposite threading of the bolt 84 expands the diaphragms to permit contraction of the sealing ring 82 to release the closure 76 for removal and access to the interior of the tube 10.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A combination drain and trap unit comprising a straight tubular body to be disposed vertically when in use, a drain valve seat and valve removably mounted in the upper end of said body, said tubular body having two openings in its cylindrical wall, a radially disposed tubular member secured in one of said openings and sealed at its outer end, a shaft disposed transversely in the sealed end and extending outwardly of said member for operation thereof, a valve operating lever fixed to said shaft and extending through said member and into said body for operative association with said valve, a radially disposed outlet pipe extending through the other of said openings, a trap member within said body and secured on the inner end of said pipe, and a closure member removably secured in the bottom of said body.

2. A unit according to claim 1 wherein said trap member is semicircular in cross-section, has an open bottom, an inclined top wall, and an internally threaded outlet immediately below said top wall for threading on said pipe.

3. A unit according to claim 2 wherein said closure member comprises a pair of dished diaphragms having angularly disposed rims, said diaphragms being arranged in opposed relation with their rims inclined away from each other, a sealing ring sandwiched between said rims, and a bolt threaded through the lower diaphragm and rotatively secured to the upper diaphragm, whereby said diaphragms may be compressed by said bolt to cause said rims to squeeze said ring outwardly into sealing engagement with the inner wall of said tubular body.

4. A unit according to claim 3 wherein said outlet pipe is sealed to said tubular body by a sealing ring surrounding said pipe and having an edge configuration to conform with the outer wall of said tubular body; around said other opening, and a snap ring seated in a groove around said pipe and retaining said sealing ring while permitting rotation of said pipe for threading into said trap member outlet.

5. A unit according to claim 4 wherein the outer end of said tubular member is sealed by a flexible waterproof sleeve including a ring portion sealed around the inner surface of said tubular member and around said shaft, a second ring portion sealed around said valve lever, and an intermediate bellows portion connecting said ring portions.

References Cited

UNITED STATES PATENTS

| | | | |
|---|---|---|---|
| 1,142,469 | 6/1915 | Werrbach | 137—247.13 |
| 1,176,806 | 3/1916 | Wood et al. | 137—247.13 |

LEONARD D. CHRISTIAN, *Primary Examiner.*